US010762177B2

United States Patent
Schwepp et al.

(10) Patent No.: US 10,762,177 B2
(45) Date of Patent: Sep. 1, 2020

(54) METHOD FOR PREVENTING AN UNAUTHORIZED OPERATION OF A MOTOR VEHICLE

(71) Applicant: Robert Bosch GmbH, Stuttgart (DE)

(72) Inventors: Thorsten Schwepp, Korb (DE); Ingo Opferkuch, Ditzingen (DE); Markus Ihle, Hemmingen (DE); Holger Egeler, Deckenpfronn (DE)

(73) Assignee: Robert Bosch GmbH, Stuttgart (DE)

( * ) Notice: Subject to any disclaimer, the term of this patent is extended or adjusted under 35 U.S.C. 154(b) by 492 days.

(21) Appl. No.: 14/710,050

(22) Filed: May 12, 2015

(65) Prior Publication Data
US 2015/0321642 A1 Nov. 12, 2015

(30) Foreign Application Priority Data
May 12, 2014 (DE) .......................... 10 2014 208 851

(51) Int. Cl.
*G06F 21/12* (2013.01)
*G06F 21/30* (2013.01)
*G06F 21/88* (2013.01)
*B60R 25/24* (2013.01)
*G06F 21/62* (2013.01)
*H04L 9/32* (2006.01)

(52) U.S. Cl.
CPC .............. *G06F 21/12* (2013.01); *B60R 25/24* (2013.01); *G06F 21/30* (2013.01); *G06F 21/629* (2013.01); *G06F 21/88* (2013.01); *H04L 9/32* (2013.01)

(58) Field of Classification Search
None
See application file for complete search history.

(56) References Cited

U.S. PATENT DOCUMENTS

2007/0129210 A1\* 6/2007 Kimura .................. B60R 25/06
477/97

OTHER PUBLICATIONS

Wolf, Marko & Weimerskirch, Andre (Jan. 24, 2013): Hardware Security Modules for Protecting Embedded Systems, Embedded Security . Retreived from https://www.escrypt.com/fileadmin/escrypt/pdf/WP-Embedded-HSM.pdf, retreived on Jun. 6, 2016.\*
Groll, Andre; Holle, Jan; Wolf, Marko; Wollinger, Thomas (2010): Next Generation of Automotive Security: Secure Hardware and Secure Open Platforms, 17th ITS World Congree Busas 2010. Retreived from https://www.oversee-project.com/fileadmin/oversee/scientific_publications/OVERSEE_Paper_ITS_World_2010_Final. pdf. Retreived on Jun. 6, 2016.\*
Wolf, Marko; Weimerskirch, Andre & Wollinger, Thomas (2007): State of the Art: Embedding Security in Vehicles . EURASIP Journal on Embedded Systems, VOI.2007 Article ID 74706, 16 pages. DOI:1155/2007/74706. Retreived from http://jes.eurasipjournals.springeropen.com/articles/10.1155/2007/74706. Retreived on : Jun. 6, 2016.\*

\* cited by examiner

*Primary Examiner* — Abdhesh K Jha
(74) *Attorney, Agent, or Firm* — Norton Rose Fulbright US LLP; Gerard Messina

(57) ABSTRACT

A method for preventing an unauthorized operation of a vehicle, and an electronic hardware security module for implementing the method are provided. A vehicle immobilizer software is used therein, which is at least partially stored in the electronic hardware security module.

2 Claims, 3 Drawing Sheets

Prior Art

METHOD FOR PREVENTING AN UNAUTHORIZED OPERATION OF A MOTOR VEHICLE

FIELD OF THE INVENTION

The present invention relates to a method for preventing an unauthorized operation of a motor vehicle, to an electronic hardware security module for implementing the method, and to a control unit including such an electronic hardware security module. The electronic hardware security module is used in a control unit of a motor vehicle.

BACKGROUND INFORMATION

Control units are electronic modules which, for instance, are used in motor vehicles for the control and regulation of sequences. For this purpose the control units are assigned to the components of the motor vehicle whose operation will be controlled with the aid of the assigned control unit. In order to do so, the control unit reads in data acquired by sensors and influences the operation by controlling actuators.

The described method is used in conjunction with an electronic security module which is utilized in a control unit, especially in the automotive field, in security-relevant areas. In most applications in the security-relevant areas the manipulation-proof or non-monitorable storing of data is an essential requirement. Cryptographic keys, which are utilized in symmetrical or asymmetrical encryption methods, are used for this purpose.

The employed codes and encryption methods constitute secrets that need to be kept hidden from attackers. Other uses in security-relevant areas, for example, pertain to the protection against unauthorized modifications, for instance the storing of changed serial numbers or odometer readings, the prevention of unauthorized tuning measures, etc.

Hence it is necessary to provide secure environments in control units, in which functionalities that must have access to and/or modify these secrets can be executed. These environments normally have a secure computer unit or CPU, also referred to as secure CPU, as well as a storage module. An environment of this type is called a hardware security module (HSM) in this context. It represents a high-performance module which includes hardware and software components and improves the security and trustworthiness of embedded systems. The HSM in particular helps in protecting security-critical applications and data. The security costs are also able to be reduced by an HSM, while effective protection against attackers is offered at the same time. As far as the basic structure of an HSM is concerned, reference is made to FIG. 3.

Vehicle immobilizers are devices in vehicles which are intended to prevent an unauthorized operation of the motor vehicle. Pure hardware and software approaches as well as combined hardware/software approaches are known. The vehicle immobilizer software in known vehicle immobilizers is part of the control unit software and thus has the security level of the software of the other control units.

SUMMARY

Against this background, a method, an electronic hardware security module, and a control unit are provided.

The introduced method and the described electronic hardware security module make it possible to raise the security level of the immobilizer software.

To do so, the vehicle immobilizer software, or at least portions thereof, are shifted to the hardware security module (HSM). Switch-off interfaces may additionally be safeguarded via the HSM-exclusive terminals or port pins. This means that the switch-off is controlled via the terminals of the HSM. The vehicle immobilizer software thus obtains the increased security level of the HSM.

It should be noted that the vehicle immobilizer software as part of the control unit software authenticates its counterpart via a question-answer method or a challenge/response method. The hardware security module is utilized for the cryptographic calculations. In one development, the vehicle immobilizer software in the HSM checks the authentication or performs the authentication and controls the switch-off interfaces exclusive to the HSM.

In one development, a portion of the vehicle immobilizer software remains in the control unit software and, for example, is able to actuate additional switch-off interfaces.

In one further specific embodiment, the HSM switch-off interface serves as master. The possibly additionally existing switch-off interfaces should be plausibilized with respect to the master switch-off interface of the HSM.

One possible development stage is the hardware-based linking of the described switch-off interfaces.

Additional advantages and developments of the present invention derive from the specification and the appended drawing.

It is understood that the aforementioned features and the features yet to be described may be used not only in the individually given combination but in other combinations or in isolation as well, without departing from the scope of the present invention.

DETAILED DESCRIPTION

Figure 1:
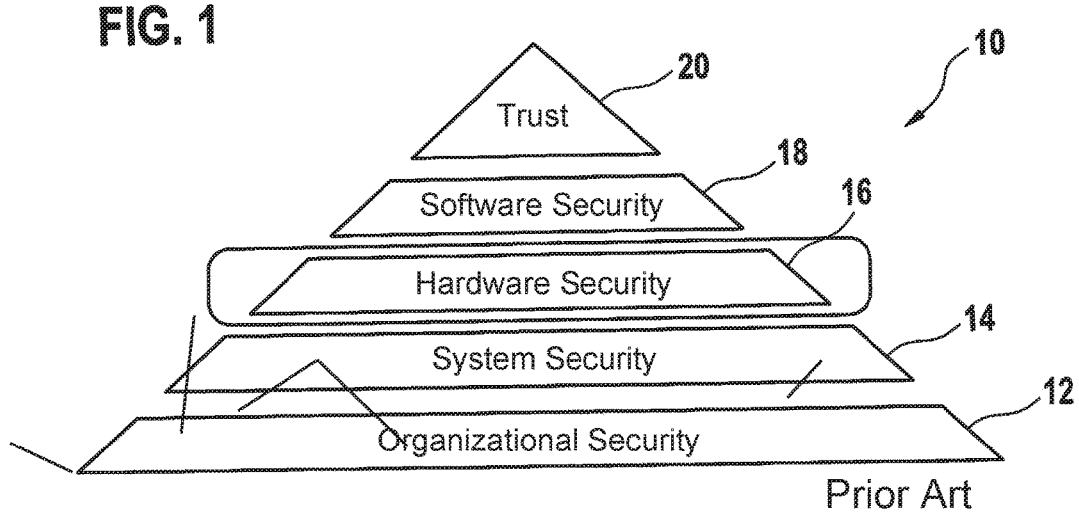
FIG. 1 shows a trust pyramid.

The present invention is represented schematically in the drawing on the basis of specific embodiments and described in the following text with reference to the drawing.

To trust an IT system that it will always act as expected requires trust in all of the incorporated layers, one after the other, in order to create a trustworthy IT system.

FIG. 1 shows a trust pyramid for a typical IT system. It is provided with reference number 10 overall and includes one layer for organizational security 12, one layer for system security 14, one layer for hardware security 16, one layer for software security 18, and an uppermost layer for trust 20.

Trust in the entire IT system requires that each layer be able to rely on the effective security of the layer situated underneath, without having the ability to verify this fact independently. For example, this means that it is possible that a perfect software and hardware security solution may turn out to be useless because of a weak security system design situated underneath. Moreover, it may be the case that a potential weakness in the system design will not be detected or prevented by the upper hardware and software layers.

In contrast to typical back and IT systems, the hardware layer of embedded systems is frequently exposed to physical attacks that influence hardware or software functionalities through physical means, e.g., manipulate a flash memory or deactivate alarm functionalities. One particular approach for making such physical attacks more difficult is the use of manipulation-proof hardware security modules (HSM), such as those shown in FIG. 2, for instance. Such an HSM protects important information, for example personal identification numbers (PIN), secure keys and critical operations such as a PIN verification, data encryption, e.g., through strong physical shielding.

The manner in which an HSM may be developed and the kind of functionalities that it is able to perform in order to improve the security of an embedded system will be shown in the following text.

Figure 2:
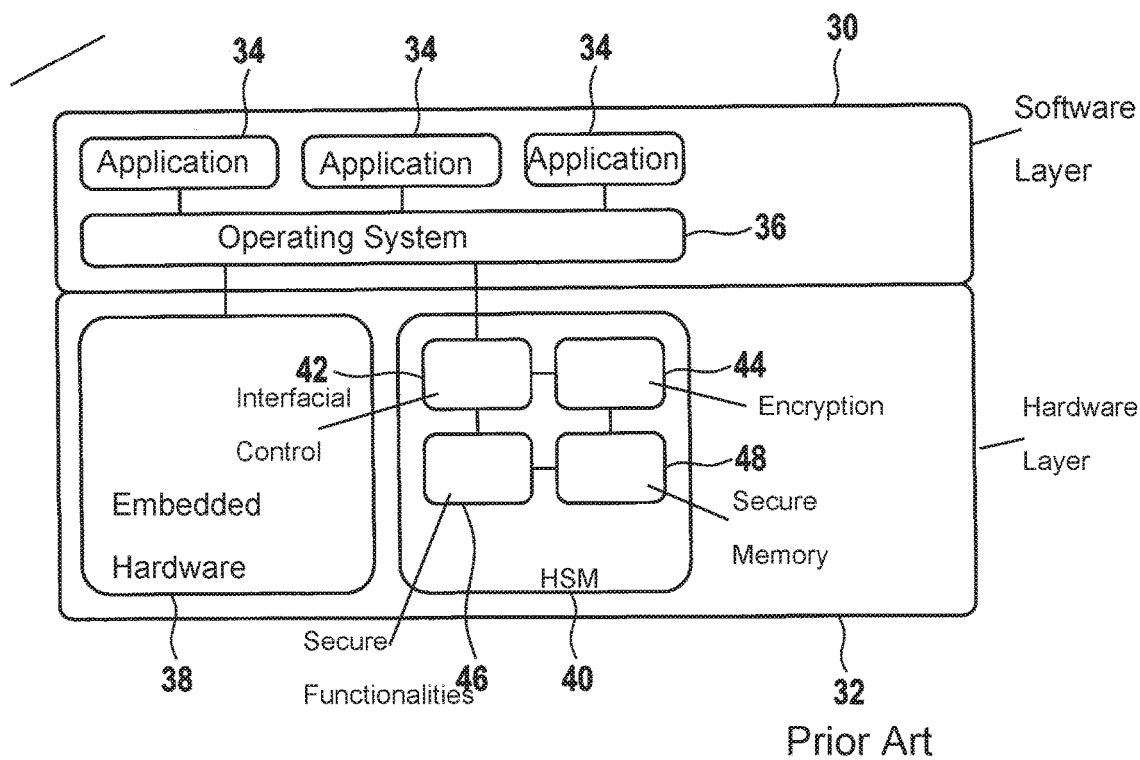
FIG. 2 shows functionalities of an HSM in a schematic representation.

FIG. 2 depicts the core functionalities of a typical hardware security module. The illustration shows a software layer 30 and a hardware layer 32 which is protected against unauthorized access.

Software layer 30 includes a number of applications 34, of which three are shown in this case. An operating system 36 is provided in addition. Hardware layer 32 includes embedded standard hardware 38 and a hardware security module (HSM) 40. A first block 42 in this HSM 40 is provided for interfaces and the control, a second block 44 is provided for secure encryption functionalities, a third block 46 is provided for secure functionalities, and a secure memory 48 is included.

Secure memory 48 is a small, non-volatile data memory, e.g., having a capacity of a few kB, within manipulation-proof HSM 40, so that an unauthorized readout or a manipulation or deletion of critical information, e.g., of cryptographic keys, cryptographic certificates or authentication data such as PINs or passwords, is prevented. Secure memory 48 of HSM 40 in addition holds all HSM configuration information, such as information pertaining to the owner of HSM 40, or access authorizations to secure internal units.

Second block 44 for secure encryption functionalities holds cryptographic algorithms which are used for data encryption and decoding, such as AES or 3DES, for data integrity amplification, such as MAC or HMAC, or a data origin verification, e.g., through the use of digital signature algorithms such as RSA or ECC, as well as all associated cryptographic activities, such as key generation and key verification, for instance.

Secure functionalities in third block 46 include all protected functionalities that are not directly assigned to a cryptographic method, HSM 40 serving as physically protected "trust anchor". For example, this may be a physically protected clock signal, an internal random-number generator, a loading program protection mechanism or some other critical application functionality, such as for realizing a secure dongle.

First block 42 for interfaces and the control includes the internal HSM logic, which implements the HSM communication with the external world and administers the operation of all internal basic components such as the aforementioned ones.

All functional basic components of hardware security module 40, as described above, are surrounded by an uninterrupted physical boundary, which prevents internal data and processes from being monitored, copied or cloned or manipulated. This could enable an unauthorized user to use or compromise internal secrets. The cryptographic boundary is commonly implemented by algorithmic and physical time channel countermeasures with dedicated access protection means, such as special shielding or layers in order to enable side channel resistance, access reporting, access resistance or an access response, for instance.

The manner in which HSM 40 is able to improve the security of an embedded product solution will be elucidated in the following text.

HSM 40 protects critical information, e.g., identities, cipher keys or keys, with the aid of the physical shield which cannot be circumvented by software susceptibility.

HSM 40 is able to assist in detecting, weakening or deterring powerful POI attackers (POI=point of interest) by implementing effective side channel resistance and access protection barriers, which, among other things, have severe access restrictions that apply even to authorized users. For example, some information is always held within HSM 40 exclusively.

HSM 40 is able to accelerate security mechanisms in which certain acceleration switching circuits are utilized.

The use of HSM 40 makes it possible to reduce the security costs by adding highly optimized special switching circuits, for instance for standardized cryptography.

Figure 3:
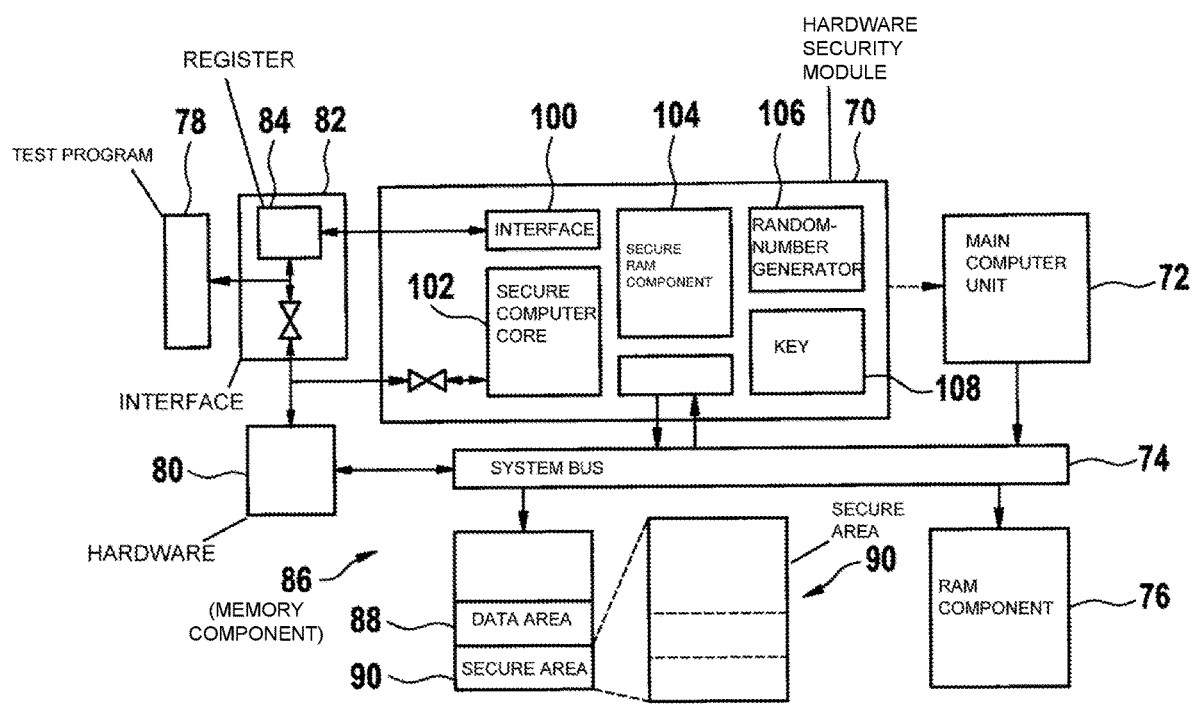
FIG. 3 shows the structure of one specific embodiment of the HSM in a schematic representation.

One possible structure of the HSM is shown in FIG. 3. It shows HSM 70, which is embedded in an environment. The figure depicts a main computer unit 72, a system bus 74, a RAM component 76 having an area for joint use, and a test program 78 or debugger including associated hardware 80 and interface 82, which in turn includes a register 84. Moreover, the figure shows a memory component 86 for flash code having a data area 88 and a secure area 90, in which secure core data are held.

Provided in HSM 70 are an interface 100 with respect to test program 78, a secure computer core 102, a secure RAM component 104, a random-number generator 106, e.g., a TRNG or PRNG, and a key 108, e.g., AES.

Figure 4:
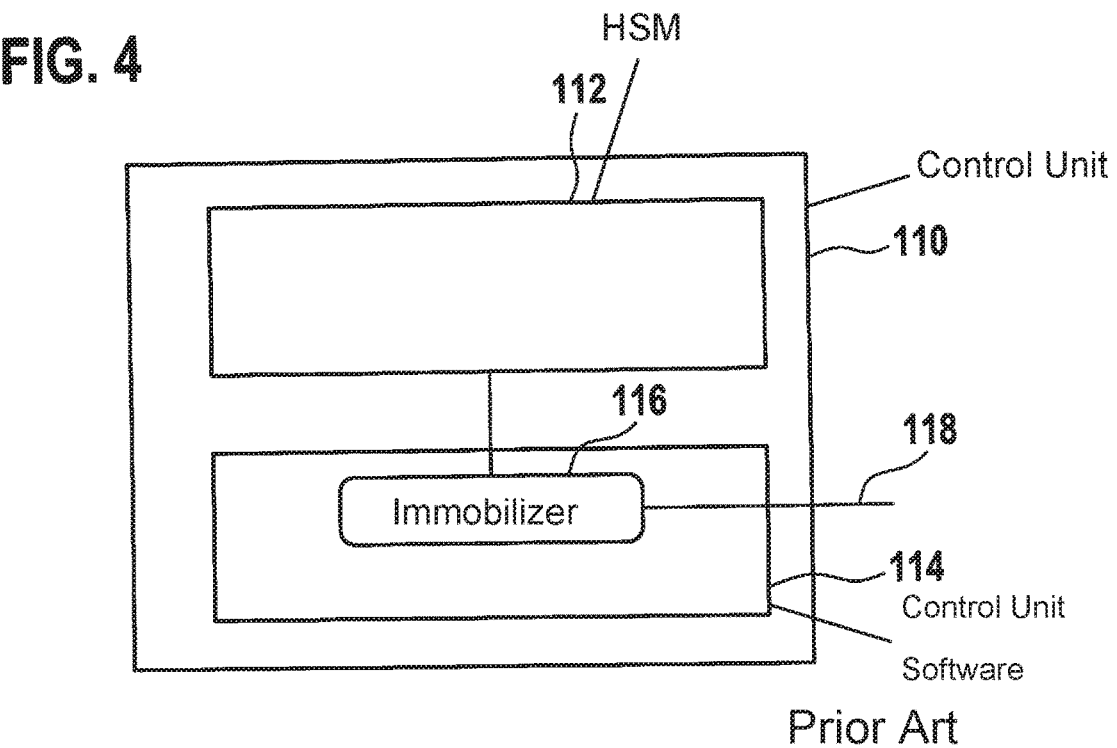
FIG. 4 shows a control unit according to the related art.

FIG. 4 shows a control unit according to the related art, which is denoted by reference numeral 110 overall. This control unit 110 includes an electronic hardware security module (HSM) 112 and control unit software 114. Part of control unit software 114 is a vehicle immobilizer software 116, which accesses a switch-off interface 118.

Control unit software 114 is typically stored in a memory that is assigned to a main computer unit (not shown) of control unit 110. This memory is conventionally developed as a non-volatile memory.

In this development, vehicle immobilizer software 116 as part of control unit software 114 authenticates its counterpart, such as via a question/answer method. A possibly required cryptographic calculation usually takes place with the aid of HSM 112. If required, vehicle immobilizer software 116 checks the authentication and controls vehicle immobilizer interface 118.

Figure 5:
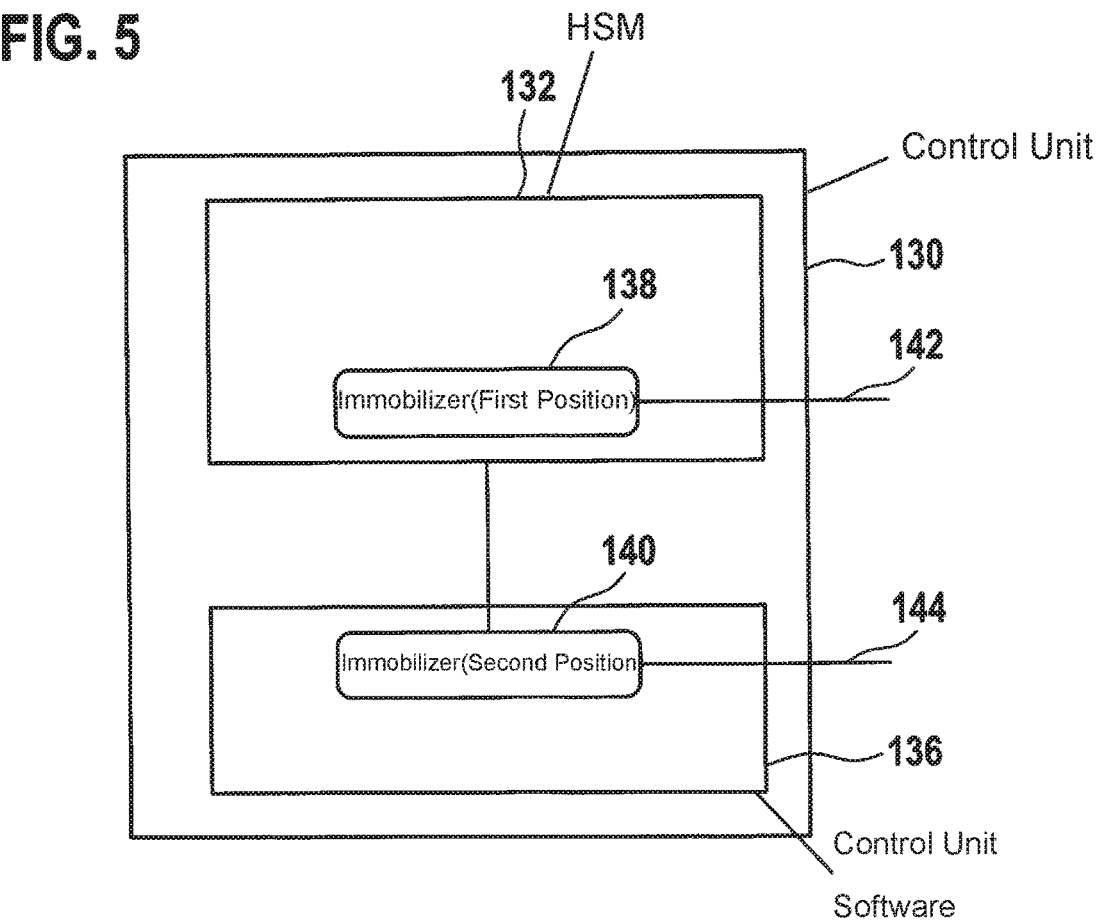
FIG. 5 shows an embodiment of the described control unit.

FIG. 5 shows a specific development of the described control unit, which is denoted by reference numeral 130 overall. This control unit 130 includes an electronic hardware security module (HSM) 132 and a control unit software 136, which is stored in a memory. A first portion 138 of a vehicle immobilizer software is stored in HSM 132. A second portion 140 of the vehicle immobilizer software is contained in control unit software 136. First portion 138 controls a first switch-off interface 142, which is provided by an exclusive HSM terminal Second portion 140 controls a second switch-off interface 144.

First portion 138 of the vehicle immobilizer software authenticates its counterpart via a question/answer method. HSM 132 is used for the cryptographic calculation. First portion 138 checks the authentication or performs the authentication and actuates first switch-off interface 142.

First switch-off interface 144 acts as master, while second switch-off interface 144 must be plausibilized with respect to first switch-off interface 142 of HSM 132. The two switch-off interfaces 142 and 144 may be connected to each other via hardware.

What is claimed is:

1. A method for preventing an unauthorized operation of a motor vehicle, which uses a vehicle immobilizer software, comprising:
 at least partially storing the vehicle immobilizer software in an electronic hardware security module, wherein:
 a first portion of the vehicle immobilizer software is stored in the electronic hardware security module,
 a second portion of the vehicle immobilizer software is stored in a control unit software,
 the first portion actuates a first switch-off interface,
 the second portion actuates a second switch-off interface,
 the second switch-off interface is plausibilized with respect to the first switch-off interface.

2. A control unit, comprising:
 an electronic hardware security module that includes a memory in which a vehicle immobilizer software is stored at least partially;
 a first switch-off interface assigned to the electronic hardware security module; and
 a second switch-off interface assigned to a control unit software, the first and second switch-off interfaces being linked to each other via hardware.

\* \* \* \* \*